US008964968B2

(12) United States Patent
O'Bara et al.

(10) Patent No.: US 8,964,968 B2
(45) Date of Patent: Feb. 24, 2015

(54) SYSTEM, VOICE CABLE ASSEMBLY, AND METHOD FOR VOICE COMMUNICATION

(75) Inventors: Christopher O'Bara, Parsippany, NJ (US); Donald R. Kerns, Jackson, NJ (US); Matthew Terranova, Ringwood, NJ (US); Christopher Devoy, Hamilton, NJ (US); Michael T. Zimmer, Lake Hopatcong, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 477 days.

(21) Appl. No.: 13/500,963

(22) PCT Filed: Aug. 2, 2011

(86) PCT No.: PCT/US2011/046218
§ 371 (c)(1),
(2), (4) Date: Apr. 9, 2012

(87) PCT Pub. No.: WO2012/018780
PCT Pub. Date: Feb. 9, 2012

(65) Prior Publication Data
US 2012/0196640 A1 Aug. 2, 2012

Related U.S. Application Data

(60) Provisional application No. 61/370,581, filed on Aug. 4, 2010.

(51) Int. Cl.
*H04M 9/00* (2006.01)
*H04B 1/46* (2006.01)

(52) U.S. Cl.
CPC ...................................... *H04B 1/46* (2013.01)
USPC .......................................... 379/413; 455/413

(58) Field of Classification Search
CPC ..... H04M 1/2535; H04M 19/08; H04M 1/02; H04M 1/72519; H04M 9/001; H04B 1/40; H04B 1/44; H04B 3/544; H04B 1/3827; H04B 1/38; H04B 1/3833; H04B 1/3888; H04B 1/401; H04B 1/405; H04W 4/10; H04W 76/005; H04W 76/02; H04W 84/02; H04W 48/16; H04W 52/02; H04L 65/4061
USPC ............ 455/572, 574, 402; 379/424, 428.04, 379/307, 32.04, 413, 93.36, 102.04, 106.04, 379/169, 176, 186, 306, 318, 322–324, 348, 379/395.01, 170, 185, 433.06
See application file for complete search history.

(56) References Cited

U.S. PATENT DOCUMENTS 4,595,983 A * 6/1986 Gehalo et al. .................... 379/36
5,784,456 A * 7/1998 Carey et al. ................... 379/419

(Continued)

FOREIGN PATENT DOCUMENTS

KR 10-1994-0004473 B1 5/1994

*Primary Examiner* — Akelaw Teshale
(74) *Attorney, Agent, or Firm* — Daniel J. Long (57) ABSTRACT

Disclosed is a system for voice communication that includes a power supply assembly, at least one handset configured to transmit voice signals, a voice cable assembly communicably coupled with the power supply assembly and the at least one handset, and a main terminal communicably coupled with the voice cable assembly. The voice cable assembly includes a cable harness configured to receive a predetermined power from the power supply assembly and to receive voice signals from the at least one handset. Also, the voice cable assembly includes a voice cable circuit card assembly communicably coupled with the cable harness to receive the predetermined power and the voice signals from the cable harness. The voice cable circuit card assembly is configured to adapt the voice signals by utilizing the predetermined power in order to match a predefined voice requirement. Further disclosed are a voice cable assembly and a method for voice communication.

20 Claims, 5 Drawing Sheets

(56) References Cited

U.S. PATENT DOCUMENTS

| | | |
|---|---|---|
| 7,564,963 B2 | 7/2009 | Bolotnikov |
| 2005/0226404 A1* | 10/2005 | Bolotnikov .............. 379/428.02 |
| 2009/0033981 A1* | 2/2009 | Natsume ...................... 358/1.15 |
| 2009/0304176 A1* | 12/2009 | Tuck et al. .................... 379/395 |

* cited by examiner

SYSTEM, VOICE CABLE ASSEMBLY, AND METHOD FOR VOICE COMMUNICATION

CROSS-REFERENCE TO RELATED APPLICATIONS

This Application claims rights under 35 USC §119(e) from U.S. Application Ser. No. 61/370,581 filed 4 Aug. 2010 the contents of which are incorporated herein by reference.

BACKGROUND OF THE INVENTION

1. Field of the Invention

The present invention relates to systems for voice communication, and more particularly, to a low maintenance voice cable assembly.

2. Brief Description of Related Art

Various types of voice communication devices/systems are known in fields, such as warfare. Suitable examples of the voice communication devices include, but are not limited to, radio systems that provide a ground link in the warfare arena to facilitate a coordination of air, land, and maritime forces while providing consummate situational awareness. In general, such voice communication devices/systems include a voice interface/voice cable assembly to communicably couple at least one handset with a terminal that may be a fixed on ground. Communication of each handset of the at least one handset with the terminal may serve as a potential means for situational awareness and/or for command and control purposes.

However, the currently available voice cable assemblies utilize a plurality of batteries for powering active circuitry thereof to facilitate voice communications. Accordingly, use of such voice cable assemblies requires constant monitoring and replacement of batteries. Consequently, the utilization of the currently available voice cable assemblies is subject to high maintenance.

Accordingly, there exists a need for an effective and a low maintenance voice cable assembly for voice communication.

SUMMARY OF THE INVENTION

In view of the foregoing disadvantages inherent in the prior art, the general purpose of the present invention is to provide a system for voice communication, a voice cable assembly, and a method for voice communication, to include all advantages of the prior art, and to overcome the drawbacks inherent in the prior art.

An object of the present invention is to ensure an effective working of a voice cable assembly for voice communications without the requirement of any constant monitoring of the voice cable assembly.

Another object of the present invention is to avert the need of regular replacement of batteries of a voice cable assembly for ensuring low maintenance of the voice cable assembly.

To achieve the above objects, in an aspect of the present invention, a system for voice communication is disclosed. The system includes a power supply assembly and at least one handset. Each handset of the at least one handset is configured to transmit voice signals. The system further includes a voice cable assembly communicably coupled with the power supply assembly and the at least one handset. The voice cable assembly includes a cable harness configured to receive a predetermined power from the power supply assembly. The cable harness is further configured to receive the voice signals from the each handset of the at least one handset. Further, the voice cable assembly includes a voice cable circuit card assembly communicably coupled with the cable harness to receive the predetermined power from the cable harness for activation and to receive the voice signals from the cable harness. The voice cable circuit card assembly is further configured to adapt the voice signals by utilizing the predetermined power in order to match a predefined voice requirement during the voice communication.

Moreover, the system includes a main terminal communicably coupled with the voice cable assembly for receiving the adapted voice signals from the voice cable assembly. The main terminal is further communicably coupled with the power supply assembly through the cable harness to receive the predetermined power from the power supply assembly. Furthermore, the main terminal is configured to transmit one or more output voice signals in response to the adapted voice signals to the voice cable assembly for transmission to the each handset of the at least one handset.

In another aspect of the present invention, a voice cable assembly for voice communication between at least one handset and a main terminal is disclosed. The voice cable assembly includes a cable harness configured to receive a predetermined power from a power supply assembly. The cable harness is further configured to receive voice signals transmitted from each handset of the at least one handset. The voice cable assembly additionally includes a voice cable circuit card assembly communicably coupled with the cable harness to receive the predetermined power from the cable harness for activation, and to receive the voice signals from the cable harness. The voice cable circuit card assembly is also configured to adapt the voice signals by utilizing the predetermined power in order to match a predefined voice requirement during voice communication with the main terminal.

In yet another aspect, the present invention provides a method for voice communication between at least one handset and a main terminal using a voice cable assembly. The method includes transmitting voice signals from one or more handsets of the at least one handset to the voice cable assembly. The voice signals are being received by a voice cable circuit card assembly through a cable harness of the voice cable assembly. The method further includes providing a predetermined power to the voice cable assembly and to the main terminal from a power supply assembly. The predetermined power as provided to the voice cable assembly is received by the voice cable circuit card assembly through the cable harness for activation of the voice cable circuit card assembly. Furthermore, the method includes adapting the voice signals by the voice cable circuit card assembly by utilizing the predetermined power while conditioning and electrically isolating the predetermined power from the voice signals. The voice signals are adapted in order to match a predefined voice requirement during voice communication with the main terminal.

Additionally, the method includes receiving the adapted voice signals from the voice cable assembly by the main terminal. Moreover, the method includes transmitting one or more output voice signals in response to the adapted voice signals to the voice cable assembly by the main terminal for further transmission to the one or more handsets of the at least one handset. In addition, the method includes adapting the one or more output voice signals transmitted from the main terminal by the voice cable circuit card assembly prior to transmitting the one or more output voice signals to the one or more handsets.

These together with the other aspects of the present invention, along with the various features of novelty that characterize the present invention, are pointed out with particularity in the claims annexed hereto and form a part of the present invention. For a better understanding of the present invention, its operating advantages, and the specified objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of the drawings.

DETAILED DESCRIPTION OF THE INVENTION

The exemplary embodiments described herein in detail for illustrative purposes are subject to many variations in structure and design. It should be emphasized, however, that the present invention is not limited to a particular system for voice communication, voice cable assembly and method for voice communication, as shown and described. It is understood that various omissions and substitutions of equivalents are contemplated as circumstances may suggest or render expedient, but these are intended to cover the application or embodiments without departing from the spirit or scope of the claims of the present invention. Also, it is to be understood that the phraseology and terminology used herein are for the purpose of description and should not be regarded as limiting.

The use of "including," "comprising," or "having" and variations thereof herein is meant to encompass the items listed thereafter and equivalents thereof as well as additional items. Further, the terms, "a" and "an" herein do not denote a limitation of quantity, but rather denote the presence of at least one of the referenced item. Unless limited otherwise, the terms "coupled," and variations thereof herein are used broadly and encompass direct and indirect couplings.

In one aspect, the present invention provides a system for voice communication. Specifically, the system of the present invention may be used for a tactical information radio system, such as a Multifunctional Information Distribution System (MIDS), which may assist in the warfare arena to facilitate simultaneous coordination of air, land, and maritime forces while maintaining consummate situational awareness, and for command and control purposes. The system of the present invention is explained with reference to FIGS. 1-6.

Figure 1:
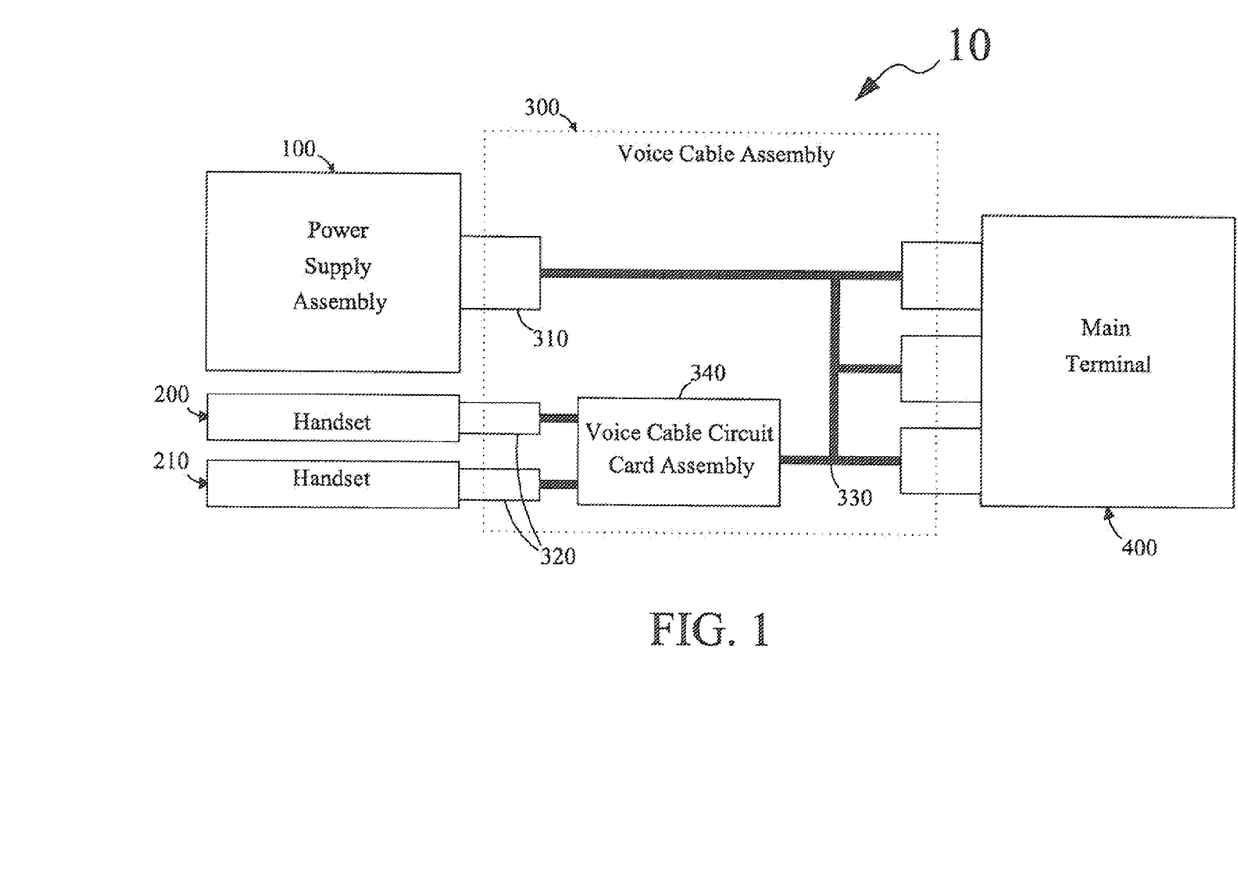
FIG. 1 illustrates a schematic block diagram depicting a system employing a voice cable assembly for voice communication, in accordance with an embodiment of the present invention.

FIG. 1 illustrates a schematic block diagram depicting a system 10 for voice communication, in accordance with an embodiment of the present invention. The system 10 includes a power supply assembly 100; at least one handset, such as a handset 200 and a handset 210; a voice cable assembly 300; and a main terminal 400.

The power supply assembly 100 may be a power supply unit/source as known in the art for the purpose of supplying power to one or more other components (as described below) of the system 10. Specifically, the power supply assembly 100 is a power supply unit to provide Direct Current (DC) power (for example, DC power of about few hundred milliwatts). Further, the power supply assembly 100 is preset to supply a predetermined power (voltage), and more specifically, 28 Volts DC power to the one or more other components of the system 10. Furthermore, the power supply assembly 100 may be of any specific structural (shape/dimension/weight) and functional configuration that is suitable for the above purpose, as known in the art.

As described above, the system 10 also includes the at least one handset, such as the handsets 200, 210. For the purpose of this description, only two handsets 200, 210, are depicted for the system 10. Each handset of the handsets 200, 210 is configured to transmit voice signals. The term, 'voice signals', as used herein above and below relates to microphone signals. Further, the each handset of the handsets 200, 210 is also configured to transmit push-to-talk signals. A suitable example of the handsets 200, 210 includes, but is not limited to, H-250 handsets. It will be evident that the handsets 200, 210 may be handsets also adapted to transmit any other type of signals, as known in the art. Furthermore, the each handset of the handsets 200, 210 may include corresponding switches/buttons, such as a push-to-talk button (not shown), to be used for an operation thereof while sending the voice signals and the push-to-talk signals. Also, the each handset of the handsets 200, 210 may be of any specific structural (shape/dimension/weight) and functional configuration that is suitable for the above purpose, as known in the art.

Furthermore, the voice cable assembly 300 of the system 10 is communicably coupled with the power supply assembly 100 and the each handset of the handsets 200, 210. Specifically, the voice cable assembly 300 is communicably coupled with the power supply assembly 100 through a first connector unit 310. The first connector unit 310 may include a female connector (not numbered) configured on the voice cable assembly 300 and coupled/engaged with a male connector (not numbered) configured on the power supply assembly 100. Alternatively, the female connector may be configured on the power supply assembly 100 and the male connector may be configured on the voice cable assembly 300. Similarly, the voice cable assembly 300 is communicably coupled with the each handset of the handsets 200, 210 through a second connector unit 320. The second connector unit 320 may include a female connector (not numbered) configured on the voice cable assembly 300 and coupled/engaged with a male connector (not numbered) configured on the each handset of the handsets 200, 210. Alternatively, the female connector may be configured on the each handset of the handsets 200, 210 and the male connector may be configured on the voice cable assembly 300.

The voice cable assembly 300 includes a cable harness 330 configured to receive the predetermined power from the power supply assembly 100 through the first connector unit 310. As described above, the predetermined power is about 28 Volts (DC power). The cable harness 330 is further configured to receive the voice signals from the each handset of the handsets 200, 210 through the second connector unit 320. Without departing from the scope of the present invention, the cable harness 330 is a string of cables/wires that transmit signals, such as voice signals, and/or operating power (currents).

The voice cable assembly 300 further includes a voice cable circuit card assembly 340 (hereinafter referred to as "assembly 340") communicably coupled with the cable harness 330 to receive the predetermined power from the cable harness 330 for activation, and to receive the voice signals from the cable harness 330. Specifically, the assembly 340 is directly coupled with the cable harness 330, as depicted in FIG. 1.

The assembly 340 is further configured to adapt the voice signals by utilizing the predetermined power in order to match a predefined voice requirement during the voice communication. Specifically, the voice signals are amplified and/or allowed to undergo impedance matching by the assembly 340 using the predetermined power in order to match the predefined voice requirement of the main terminal 400. The term, 'predefined voice requirement', as used hereinabove, corresponds to a voice requirement at the main terminal 400, and may vary with respect to the type of the main terminal 400.

Figure 2:
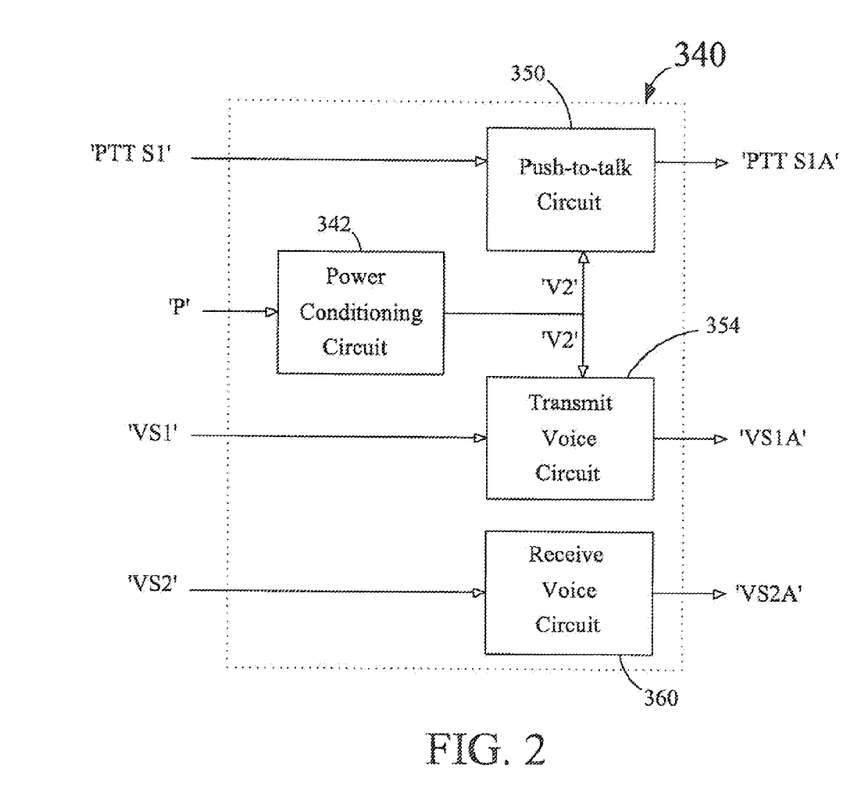
FIG. 2 illustrates a schematic block diagram of a voice cable circuit card assembly of the voice cable assembly of the system of FIG. 1.

Referring to FIG. 2, the assembly 340 includes a power conditioning circuit 342 configured to receive the predetermined power, depicted by 'P', from the cable harness 330 as supplied by the power supply assembly 100. Specifically, the predetermined power 'P' is required for the activation of the power conditioning circuit 342. Further, the utilization of the predetermined power 'P' by the assembly 340, and more specifically, the power conditioning circuit 342, entails several steps of conditioning to meet Electromagnetic Interference (EMI) and Electromagnetic Compatibility (EMC) requirements. The power conditioning circuit 342 assists in conditioning of the predetermined power 'P' to fulfill the aforementioned requirements.

Figure 3:
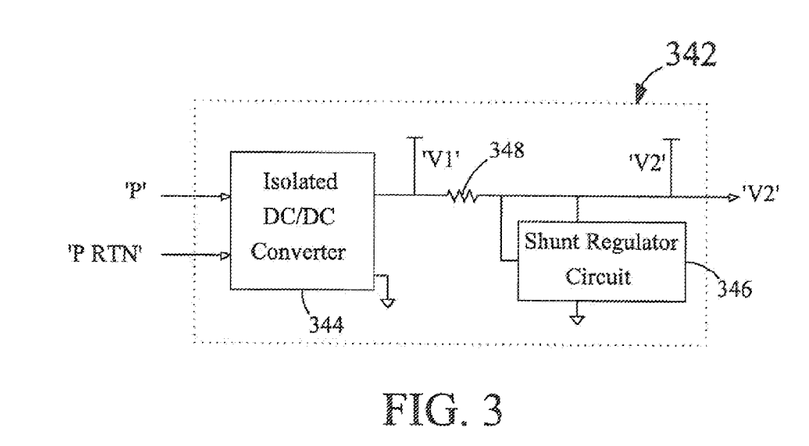
FIG. 3 illustrates a schematic block diagram of a power conditioning circuit of the voice cable circuit card assembly of FIG. 2.

The power conditioning circuit 342 includes an isolated direct current (DC/DC voltage) converter 344 (hereinafter referred to as "converter 344") for generating a first predefined voltage 'V1' based on the predetermined power 'P', as depicted in FIG. 3. For the purpose of this description, the first predefined voltage 'V1' is about 12 Volts. The converter 344 is further configured to electrically isolate the predetermined power 'P' and the voice signals from the assembly 340, in order to provide high frequency isolation. The converter 344 as used herein may be a suitable isolated DC/DC converter that assists in electrically isolating the predetermined power 'P'.

The power conditioning circuit 342 also includes a shunt regulator 346 (depicted as a shunt regulator circuit 346) communicably coupled with the converter 344 to receive the isolated predetermined power 'P' for further electrically isolating the predetermined power 'P' from the voice signals. The shunt regulator 346 is also configured to receive the first predefined voltage 'V1' from the converter 344 and to convert the first predefined voltage 'V1' to a second predefined voltage 'V2' lower than the first predefined voltage 'V1'. For the purpose of this description, the second predefined voltage 'V2' is about 11 Volts. The shunt regulator 346 is further configured to provide a constant load to the power supply assembly 100 at predefined voice frequencies while maintaining the electrical isolation between the voice signals and the predetermined power 'P'. Specifically, the shunt regulator 346 monitors the voltage drop across a resistor 348 (a 50 ohm resistor), and sinks the appropriate amount of current from 11 Volts (second predefined voltage 'V2') line (not numbered) to keep the voltage drop across the resistor 348 constant. Accordingly, the shunt regulator 346 is capable of providing a constant load to the power supply assembly 100 at the predefined voice frequencies, thereby providing greater than 90 Decibel (dB) of isolation between the voice signals and the predetermined power 'P'.

It will be evident that the shunt regulator 346 may be a shunt regulator as known in the art for the above purposes. Further, the power conditioning circuit 342 that employs the shunt regulator 346 serves as a shunt regulated power supply circuit.

Based on the aforementioned, passing of the predetermined power 'P' through the converter 344 serves to electrically isolate the predetermined power 'P' and ground from the assembly 340, and passing of the isolated predetermined power 'P' through the shunt regulator 346 further electrically isolates the predetermined power 'P' and the voice signals at lower frequencies nearly down to DC.

The power conditioning circuit 342 is also configured within a shielded compartment (not shown) to further electrically isolate the predetermined power 'P' from the voice signals. Specifically, the converter 344 and the other power components are located in a separate shielded compartment for achieving further electrical isolation of the predetermined power 'P'. As depicted in FIG. 3, the term 'P RTN' refers to the returning predetermined power required to complete the power conditioning circuit 342.

Figure 4:
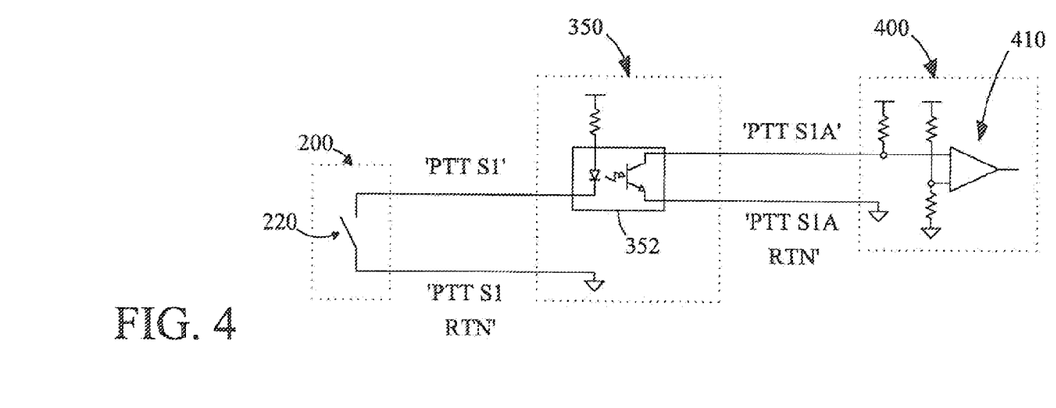
FIG. 4 illustrates a schematic block diagram of a push-to-talk circuit of the voice cable circuit card assembly of FIG. 2, in communication with a handset and a main terminal of the system of FIG. 1.

Referring again to FIG. 2, the assembly 340 also includes a push-to-talk circuit 350 communicably coupled with the power conditioning circuit 342 to receive the second predefined voltage 'V2' for activation. It will be evident that the push-to-talk circuit 350 may be communicably coupled with the power conditioning circuit 342 through a suitable means, such as one or more wires and the like, as known in the art for the purpose of transmission of power/voltage. The push-to-talk circuit 350 is configured to receive the push-to-talk signals (depicted as 'PTT S1') of the each handset of the handsets 200, 210; and transmit the received push-to-talk signals (depicted as 'PTT S1A') to the main terminal 400, on activation, while maintaining the electrical isolation provided by the power conditioning circuit 342 (as depicted in FIG. 2). As depicted in FIG. 4, the push-to-talk circuit 350 is configured to receive the push-to-talk signals 'PTT S1', of the handset 200; and transmit the received push-to-talk signals 'PTT S1' as push-to-talk signal's 'PTT S1A' to the main terminal 400. For the purpose of simplicity, only one handset, i.e., the handset 200, of the at least one handset of the system 10 is depicted in FIG. 4. The push-to-talk signals 'PTT S1A' as transmitted by the push-to-talk circuit 350 may also be adapted by amplification/impedance matching or any such other mechanism, by the push-to-talk circuit 350, in order to be compatible with the requirements of the main terminal 400.

Further, as depicted in FIG. 4, a portion of a first driver circuit depicting a switch 220, of the handset 200 may be employed for the transmission of the push-to-talk signals 'PTT S1'; and a first receiver circuit 410 of the main terminal 400 may be employed for receiving the push-to-talk signals 'PIT S1A'. Accordingly, the push-to-talk circuit 350 provides the push-to-talk signals 'PIT S1' from the handset 200 to the main terminal 400 as push-to-talk signals 'PTT S1A', while retaining the electrical isolation provided by the power conditioning circuit 342. Specifically, the push-to-talk circuit 350 of the assembly 340 may employ one or more opto-couplers/opto-isolators, such as an opto-coupler 352, for performing the above function. The opto-coupler 352 may be a suitable opto-coupler as known in the art for transferring electrical signals to provide coupling with electrical isolation between respective input and output. Further, as depicted in FIG. 4, the terms, 'PTT S1 RTN' and 'PTT S1A RTN' refer to corresponding returning push-to-talk signals to complete the circuit among the push-to-talk circuit 350, the first driver circuit of the handset 200, and the first receiver circuit 410 of the main terminal 400. It will also be understood that the push-to-talk circuit 350 of the assembly 340 may also include other components, such as one or more resistors and the like, as known in the art for the purpose of receiving the push-to-talk signals 'PTT S1' and transmitting the push-to-talk signals 'PTT S1A' therefrom. Similarly, the first driver circuit of the handset 200 may include other components as known in the art for the purpose of transmitting the push-to-talk signals 'PTT S1'. Further, the first receiver circuit 410 of the main terminal 400 may include other components, such as one or more resistors, one or more operational amplifiers, and the like, as known in the art for the purpose of receiving the push-to-talk signals 'PTT S1A'.

Figure 5:
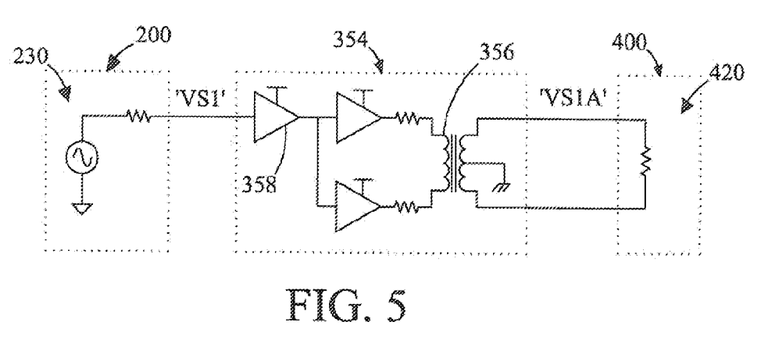
FIG. 5 illustrates a schematic block diagram of a transmit voice circuit of the voice cable circuit card assembly of FIG. 2, in communication with a handset and a main terminal of the system of FIG. 1.

In addition, the assembly 340 includes a transmit voice circuit 354 communicably coupled with the power conditioning circuit 342 to receive the second predefined voltage 'V2' for activation (as depicted in FIG. 2). It will be evident that the transmit voice circuit 354 may be communicably coupled with the power conditioning circuit 342 through a suitable means, such as one or more wires and the like, as known in the art for the purpose of transmission of power/voltage. The transmit voice circuit 354 is configured to receive the voice signals of the each handset of the handsets 200, 210; adapt the voice signals by amplification and/or impedance matching to provide adapted voice signals; and to transmit the adapted voice signals to the main terminal 400, on activation while maintaining the electrical isolation provided by the power conditioning circuit 342. As depicted in FIGS. 2 and 5, the transmit voice circuit 354 is configured to receive the voice signals, depicted as 'VS1' of the handset 200; adapt the voice signals 'VS1' by amplification and impedance matching to provide adapted voice signals 'VS1A'; and to transmit the adapted voice signals 'VS1A' to the main terminal 400. The adapted voice signals 'VS1A' as transmitted by the transmit voice circuit 354 are adapted by amplification and impedance matching by the transmit voice circuit 354, in order to be compatible with the requirements of the main terminal 400. For the purpose of simplicity, only one handset, i.e., the handset 200, of the at least one handset of the system 10 is depicted in FIG. 5.

Further, as depicted in FIG. 5, a second driver circuit 230 of the handset 200 may be employed for the transmission of the voice signals 'VS1'; and a second receiver circuit 420 of the main terminal 400 may be employed for receiving the adapted voice signals 'VS1A'. Accordingly, the transmit voice circuit 354 provides the amplification and impedance matching to adapt the voice signals 'VS1' from the handset 200 to the voice input circuit, i.e., the second receiving circuit 420, of the main terminal 400 while retaining the electrical isolation provided by the power conditioning circuit 342. Specifically, the transmit voice circuit 354 of the assembly 340 may employ one or more transformers, such as a transformer 356, for performing the above function. The transformer 356 may be a 1:1 isolation transformer as known in the art. In addition, the transmit voice circuit 354 may employ one or more operational amplifiers, such as an operational amplifier 358. The operational amplifier 358 may be a suitable operational amplifier as known in the art for producing an output voltage that is larger than the voltage difference between respective input terminals thereof. It will also be understood that the transmit voice circuit 354 of the assembly 340 may also include other components, such as one or more resistors, and the like, as known in the art for the purpose of receiving the voice signals 'VS1' and transmitting the adapted voice signals 'VS1A'. Similarly, the second driver circuit 230 of the handset 200 may include other components, such as one or more resistors and the like, as known in the art for the purpose of transmitting the voice signals 'VS1'. Also, the second receiver circuit 420 of the main terminal 400 may include other components, such as one or more resistors, and the like, as known in the art for the purpose of receiving the adapted voice signals 'VS1A'.

Further, the use of opto-couplers/opto-isolators and/or transformers in the corresponding push-to-talk circuit 350 and the transmit voice circuit 354 of the assembly 340 assists in isolating the push-to-talk signals 'PTT S1'/'PTT S1A' and the voice signals 'VS1'/'VS1A' for efficient working of the system 10.

Figure 6:
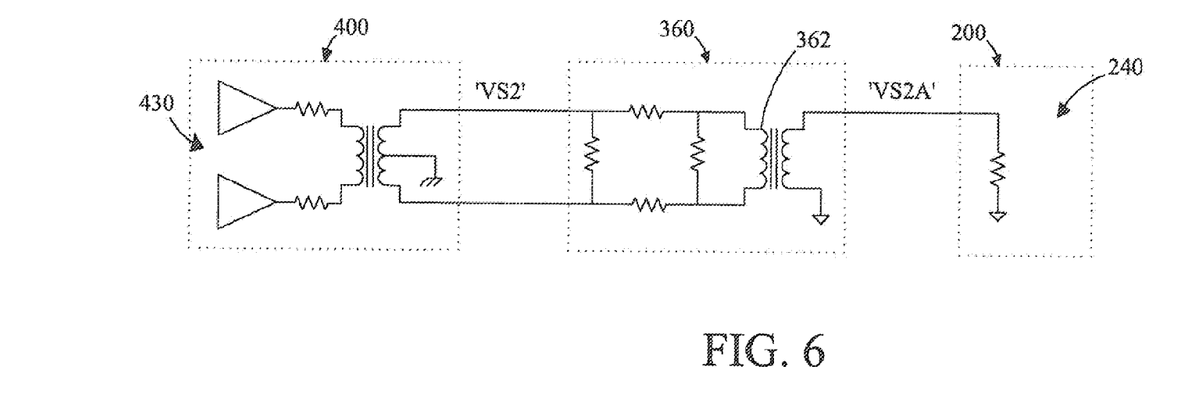
FIG. 6 illustrates a schematic block diagram of a receive voice circuit of the voice cable circuit card assembly of FIG. 2, in communication with a handset and a main terminal of the system of FIG. 1.

Moreover, the assembly 340 includes a receive voice circuit 360 communicably coupled with the main terminal 400 to adapt one or more output voice signals transmitted from the main terminal 400 and to be received by a corresponding handset of the handsets 200, 210 (as depicted in FIGS. 2 and 6). The one or more output voice signals transmitted from the main terminal 400 are represented by 'VS2'; and the adapted one or more output voice signals that are depicted to be transmitted from the receive voice circuit 360 are represented by 'VS2A'.

The one or more output voice signals 'VS2' correspond to the voice signals (depicted as 'VS1' in FIG. 2) transmitted by the corresponding handset of the handsets 200, 210. Accordingly, the receive voice circuit 360 is also communicably coupled to the handsets 200, 210. Further, the communicable coupling between the receive voice circuit 360 and the each handset of the handsets 200, 210; and between the receive voice circuit 360 and the main terminal 400, may be achieved through the cable harness 330.

Furthermore, as depicted in FIG. 6, a driver circuit 430 of the main terminal 400 may be employed for transmitting the one or more output voice signals 'VS2'; and a 1 kilo ohm load, depicted by load 240, presented by an earpiece (not shown) of the handset 200, may be employed for receiving the adapted one or more output voice signals 'VS2A' from the main terminal 400. Accordingly, the receive voice circuit 360 provides the attenuation and impedance matching to adapt the one or more output voice signals 'VS2' from the main terminal 400 to the earpiece of the handset 200. Specifically, the receive voice circuit 360 of the assembly 340 may employ one or more transformers, such as a transformer 362, for performing the above function. The transformer 362 may be a 1:1 isolation transformer as known in the art.

It will also be understood that the receive voice circuit 360 of the assembly 340 may also include other components, such as one or more resistors, and the like, as known in the art for the purpose of receiving the one or more output voice signals 'VS2' and transmitting the adapted one or more output voice signals 'VS2A'. Similarly, the driver circuit 430 of the main terminal 400 may include other components, such as one or more resistors, one or more operational amplifiers, and the like, as known in the art for the purpose of transmitting the one or more output voice signals 'VS2'. Also, the handset 200 may include other components, such as one or more resistors, and the like, as known in the art for the purpose of receiving the adapted one or more output voice signals 'VS2A'.

The main terminal 400, as described above, is communicably coupled with the voice cable assembly 300, and more specifically, with the push-to-talk circuit 350, the transmit voice circuit 354, and the receive voice circuit 360, as depicted in FIGS. 1 and 2; and FIGS. 4-6. Specifically, the main terminal 400 is communicably coupled with the voice cable assembly 300 through connector units (not numbered) similar to the first and second connector units 310, 320, and the cable harness 330. Further, the main terminal 400 is configured to receive the adapted voice signals 'VS1A' (as depicted in FIG. 5) and the push-to-talk signals 'PTT S1A' (as depicted in FIG. 4) from the voice cable assembly 300. The main terminal 400 is further communicably coupled with the power supply assembly 100 through the cable harness 330 to receive the predetermined power 'P' from the power supply assembly 100. The main terminal 400 is also configured to transmit the one or more output voice signals 'VS2' in response to the adapted voice signals 'VS1A' to the voice cable assembly 300 for transmission to the each handset of the handsets 200, 210 (as depicted in FIGS. 2 and 6). For this description of the present invention, the main terminal 400 is a low volume terminal for systems, such as MIDS. Furthermore, the main terminal 400 may be of any specific structural (shape/dimension/weight) and functional configuration that is suitable for the above purpose, as known in the art.

Based on the foregoing, the voice cable assembly 300 of the system 10, assists in making connections between the power supply assembly 100 and main terminal 400, and in providing circuitry to adapt voice signals from the handsets 200, 210 to the requirements of the main terminal 400. Specifically, the main function of the voice cable assembly 300 is to amplify the voice signals (microphone signals) from the each handset of the handsets 200, 210, to match the input voice requirements at the main terminal 400. Amplification of the voice signals is achieved by the utilization of an active voice circuitry as formed by the power conditioning circuit 342, the push-to-talk circuit 350, the transmit voice circuit 354, and the receive voice circuit 360, which requires a power source, i.e., the predetermined power 'P' routed between the power supply assembly 100 and the main terminal 400 in the voice cable assembly 300 through the cable harness 330. Specifically, the predetermined power 'P' exists as an isolated power in the active voice circuitry/cable harness 330 for being used by the active voice circuitry of the voice cable assembly 300.

Further and as described above, the utilization of the predetermined power 'P' entails conditioning and electrical isolation of the predetermined power 'P' to fulfill the EMI and EMC requirements when using the voice cable assembly 300. Furthermore, the cable harness 330 may also be at least partially shielded to achieve further isolation. Specifically, the cable harness 330 may be shielded up to the active voice circuitry.

It will be understood that the system 10 may include other suitable components for functions related to integrated position determination, navigation and identification, voice and data communications, as known in the art, for an information distribution system (radio system), as per a manufacturer's preference.

In another aspect, the present invention provides a voice cable assembly, such as the voice cable assembly 300 of the system 10 of FIG. 1, for voice communication between at least one handset, such as the handsets 200, 210, and a main terminal, such as the main terminal 400. The voice cable assembly of the present invention includes a cable harness, such as the cable harness 330, configured to receive a predetermined power (such as the predetermined power 'P') from a power supply assembly, such as the power supply assembly 100. The cable harness is further configured to receive voice signals transmitted from each handset of the at least one handset. Further, the voice cable assembly of the present invention includes a voice cable circuit card assembly, such as the assembly 340, communicably coupled with the cable harness to receive the predetermined power from the cable harness for activation and to receive the voice signals from the cable harness. The voice cable circuit card assembly is configured to adapt the voice signals by utilizing the predetermined power in order to match a predefined voice requirement during voice communication with the main terminal. The voice cable assembly is described above in detail with reference to FIGS. 1-6. Accordingly, a description of the voice cable assembly of the present invention is avoided herein for the sake of brevity.

Figure 7:
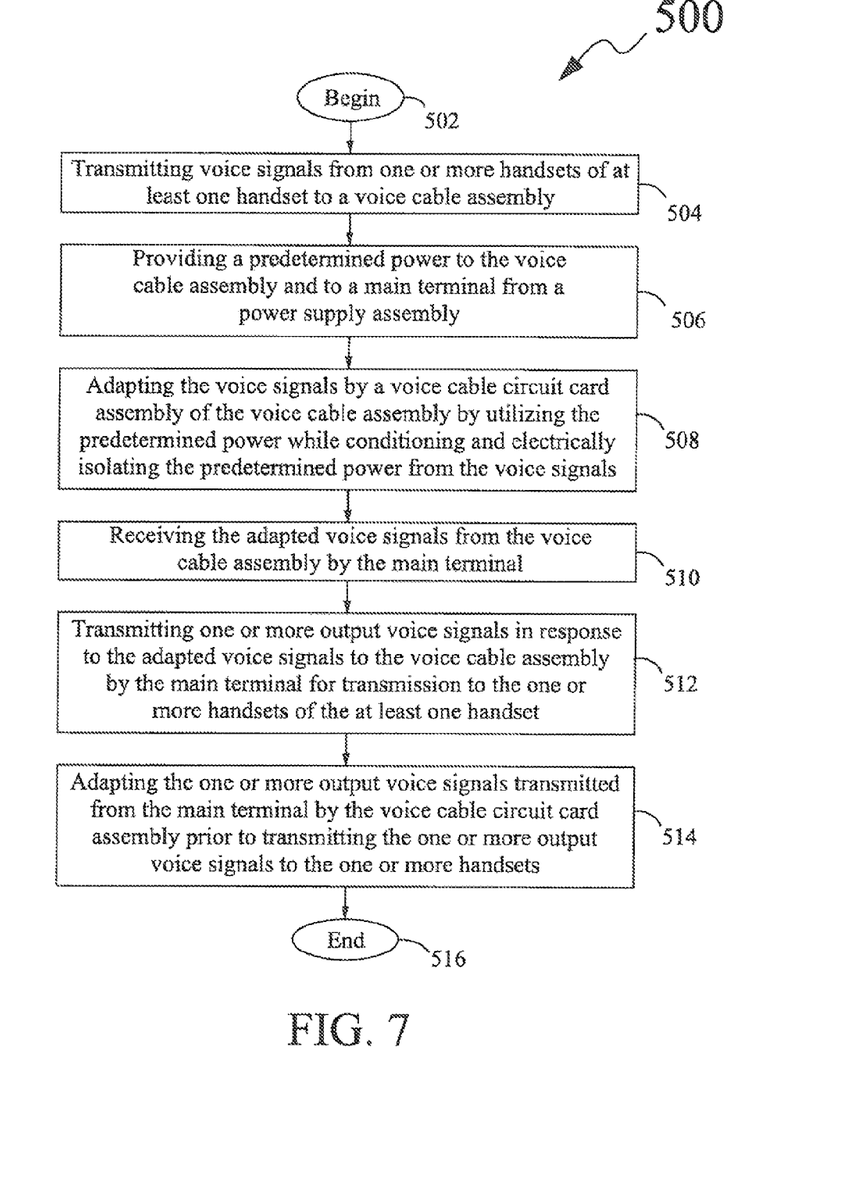
FIG. 7 illustrates a method for voice communication using the voice cable assembly of the system of FIG. 1.

In yet another aspect, the present invention provides a method for voice communication between at least one handset and a main terminal using a voice cable assembly. Specifically and as depicted in FIG. 7, the present invention provides a method 500 for voice communication using the voice cable assembly 300 of the system 10 of FIG. 1. Further, reference will be made to the system 10 and components thereof for describing the method 500.

The method 500 begins at 502. At 504, voice signals (such as the voice signals 'VS1') are transmitted from one or more handsets of the at least one handset, such as the handsets 200, 210, to the voice cable assembly 300. Specifically, the voice signals are received by the assembly 340 through the cable harness 330 of the voice cable assembly 300. It will be understood that push-to-talk signals (such as the push-to-talk signals 'PTT S1') are also transmitted from the one or more handsets of the at least one handset, such as the handsets 200, 210, along with the voice signals.

At 506, the predetermined power (such as the predetermined power 'P') is provided to the voice cable assembly 300 and to the main terminal 400 from the power supply assembly 100. Specifically, the predetermined power as provided to the voice cable assembly 300 is received by the assembly 340 through the cable harness 330 for activation of the assembly 340.

At 508, the voice signals are adapted by the assembly 340 by utilizing the predetermined power while conditioning and electrically isolating the predetermined power from the voice signals. The voice signals are adapted in order to match the predefined voice requirement during voice communication with the main terminal 400.

Specifically, the utilization of the predetermined power includes activating the power conditioning circuit 342 of the assembly 340, generating the first predefined voltage 'V1' by the converter 344 of the power conditioning circuit 342 based on the predetermined power, and converting the first predefined voltage 'V1' to the second predefined voltage 'V2' by the shunt regulator 346 of the power conditioning circuit 342. Further and as described above, the utilization of the predetermined power requires conditioning of the predetermined power by electrically isolating the predetermined power and the voice signals from the assembly 340 by the converter 344, and passing the isolated predetermined power through the shunt regulator 346 for further electrical isolation. Further, the method 500 includes providing the second predefined voltage 'V2' to the transmit voice circuit 354 of the assembly 340 for activation and for adapting the voice signals; and transmitting the adapted voice signals of the each handset of the handsets 200, 210, to the main terminal 400 on activation of the transmit voice circuit 354 while maintaining the electrical isolation provided by the power conditioning circuit 342. It will be understood that the method 500 also includes providing the second predefined voltage 'V2' to the push-to-talk circuit 350 of the assembly 340 for activation, and transmitting the push-to-talk signals of the each handset of the handsets 200, 210, to the main terminal 400, on activation of the push-to-talk circuit 350 while maintaining the electrical isolation provided by the power conditioning circuit 342.

At 510, the adapted voice signals are received by the main terminal 400 from the voice cable assembly 300.

At 512, one or more output voice signals (such as the one or more output voice signals 'VS2') are transmitted in response to the adapted voice signals to the voice cable assembly 300 by the main terminal 400 for transmission to the one or more handsets of the handsets 200, 210.

At 514, the one or more output voice signals as transmitted from the main terminal 400 are adapted by the assembly 340 prior to transmitting the one or more output voice signals to the one or more handsets of the handsets 200, 210. Specifically, the one or more output voice signals are adapted by the receive voice circuit 360 of the assembly 340. The method 500 ends at 516.

Based on the foregoing, the present invention provides a system 10, a voice cable assembly 300 and a method 500, for efficient voice communication. The utilization of the present invention assists in meeting the system level EMI/EMC requirements for power isolation while passing voice signals through an active voice circuitry of the voice cable assembly 300. Specifically, the present invention provides several electrical and mechanical isolation and conditioning means (such as the converter 344) to maintain EMI/EMC compliance. Further, providing a power source (predetermined power 'P', i.e., 28 Volts DC power) in a cable harness (such as the cable harness 330), and in the active voice circuitry, assists in averting the need of frequent monitoring of batteries as opposed to the conventional systems/voice cable assemblies for voice communication. Accordingly, the present invention provides a low maintenance voice cable assembly.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A system for voice communication, the system comprising:
    a power supply assembly;
    at least one handset, each handset of the at least one handset being configured to transmit voice signals;
    a voice cable assembly communicably coupled with the power supply assembly and the at least one handset, the voice cable assembly comprising:
        a cable harness configured to receive a predetermined power from the power supply assembly, the cable harness further configured to receive the voice signals from the each handset of the at least one handset; and
        a voice cable circuit card assembly communicably coupled with the cable harness to receive the predetermined power from the cable harness for activation and to receive the voice signals from the cable harness, the voice cable circuit card assembly further configured to adapt the voice signals by utilizing the predetermined power in order to match a predefined voice requirement during the voice communication; and
    a main terminal communicably coupled with the voice cable assembly for receiving the adapted voice signals from the voice cable assembly, the main terminal further communicably coupled with the power supply assembly through the cable harness to receive the predetermined power from the power supply assembly, the main terminal being configured to transmit one or more output voice signals in response to the adapted voice signals to the voice cable assembly for transmission to the each handset of the at least one handset, wherein the voice cable circuit card assembly is configured for generating a first predefined voltage based one the predetermined power and converting the first predefined voltage to a second predefined voltage lower than the first predefined voltage and configured for electrically isolating the predetermined power and the voice signals from the voice cable circuit card assembly and the voice cable circuit card assembly comprising:
        a push-to-talk circuit communicably coupled with a power conditioning circuit to receive the second predefined voltage for activation, the push-to-talk circuit being configured to receive push-to-talk signals of the each handset and to transmit the push-to-talk signals to the main terminal on activation while maintaining the electrical isolation provided by the power conditioning circuit.

2. The system of claim 1, wherein the predefined voice requirement corresponds to a voice requirement at the main terminal.

3. The system of claim 1, wherein the voice signals are amplified by the voice cable circuit card assembly using the predetermined power.

4. The system of claim 1, wherein the voice signals are microphone signals.

5. The system of claim 1, wherein the predetermined power is about 28 Volts.

6. The system of claim 1, wherein the voice cable circuit card assembly comprises:
    the power conditioning circuit configured to receive the predetermined power from the cable harness for activation, the power conditioning circuit comprising:
        an isolated direct current voltage converter for generating the first predefined voltage based on the predetermined power, the isolated direct current voltage converter further configured to electrically isolate the predetermined power and the voice signals from the voice cable circuit card assembly; and
        a shunt regulator communicably coupled with the isolated direct current voltage converter to receive the isolated predetermined power for further electrically isolating the predetermined power from the voice signals, and to receive the first predefined voltage for converting the first predefined voltage to the second predefined voltage lower than the first predefined voltage, the shunt regulator further configured to provide a constant load to the power supply assembly at predefined voice frequencies while maintaining the electrical isolation between the voice signals and the predetermined power;
a transmit voice circuit communicably coupled with the power conditioning circuit to receive the second predefined voltage for activation, the transmit voice circuit being configured to receive and adapt the voice signals of the each handset, and to transmit the adapted voice signals to the main terminal on activation while maintaining the electrical isolation provided by the power conditioning circuit, and
a receive voice circuit communicably coupled with the main terminal to adapt one or more output voice signals transmitted from the main terminal and to be received by a corresponding handset of the at least one handset, wherein the one or more output voice signals correspond to the voice signals transmitted by the corresponding handset.

7. The system of claim 6, wherein the power conditioning circuit is configured within a shielded compartment to further electricity isolate the predetermined power from the voice signals.

8. The system of claim 6, wherein the voice cable circuit card assembly is configured to isolate the push-to-talk signals and the voice signals.

9. The system of claim 1, wherein the cable harness is at least partially shielded.

10. A voice cable assembly for voice communication between at least one handset and a main terminal, the voice cable assembly comprising:
a cable harness configured to receive a predetermined power from a power supply assembly, the cable harness further configured to receive voice signals transmitted from each handset of the at least one handset; and
a voice cable circuit card assembly communicably coupled with the cable harness to receive the predetermined power from the cable harness for activation and to receive the voice signals from the cable harness, the voice cable circuit card assembly configured to adapt the voice signals by utilizing the predetermined power in order to match a predefined voice requirement during voice communication with the main terminal, wherein the voice cable circuit card assembly is configured for generating a first predefined voltage based on the predetermined power and converting the first predefined voltage to a second predefined voltage lower than the first predefined voltage and configured for electrically isolating the predetermined power and the voice signals from the voice cable circuit card assembly and the voice cable circuit card assembly comprising:
a push-to-talk circuit communicably coupled with a power conditioning circuit to receive the second predefined voltage for activation, the push-to-talk circuit being configured to receive push-to-talk signals of the each handset and to transmit the push-to-talk signals to the main terminal on activation while maintaining the electrical isolation provided by the power conditioning circuit.

11. The voice cable assembly of claim 10, wherein the predefined voice requirement corresponds to a voice requirement at the main terminal.

12. The voice cable assembly of claim 10, wherein the voice signals are adapted by the voice cable circuit card assembly by amplification using the predetermined power.

13. The voice cable assembly of claim 10, wherein the voice signals are microphone signals.

14. The voice cable assembly of claim 10, wherein the predetermined power is about 28 Volts.

15. The voice cable assembly of claim 10, wherein the voice cable circuit card assembly comprises,
the power conditioning circuit configured to receive the predetermined power from the cable harness for activation, the power conditioning circuit comprising:
an isolated direct current voltage converter for generating a first predefined voltage based on the predetermined power, the isolated direct current voltage converter further configured to electrically isolate the predetermined power and the voice signals from the voice cable circuit card assembly; and
a shunt regulator communicably coupled with the isolated direct current voltage converter to receive the isolated predetermined power for further electrically isolating the predetermined power from the voice signals, and to receive the first predefined voltage for converting the first predefined voltage to the second predefined voltage lower than the first predefined voltage, the shunt regulator further configured to provide a constant load to the power supply assembly at predefined voice frequencies while providing the electrical isolation between the voice signals and the predetermined power;
a transmit voice circuit communicably coupled with the power conditioning circuit to receive the second predefined voltage for activation, the transmit voice circuit being configured to receive and adapt the voice signals of the each handset, and to transmit the adapted voice signals to the main terminal on activation while maintaining the electrical isolation provided by the power conditioning circuit; and
a receive voice circuit communicably coupled with the main terminal to adapt one or more output voice signals transmitted from the main terminal and to be received by a corresponding handset of the at least one handset, wherein the one or more output voice signals correspond to the voice signals transmitted by the corresponding handset.

16. A method for voice communication between at least one handset and a main terminal using a voice cable assembly, the method comprising:
transmitting voice signals from one or more handsets of the at least one handset to the voice cable assembly, the voice signals being received by a voice cable circuit card assembly through a cable harness of the voice cable assembly;
providing a predetermined power to the voice cable assembly and to the main terminal from a power supply assembly, wherein the predetermined power provided to the voice cable assembly is received by the voice cable circuit card assembly through the cable harness for activation of the voice cable circuit card assembly;
adapting the voice signals by the voice cable circuit card assembly by utilizing the predetermined power while conditioning and electrically isolating the predetermined power from the voice signals, the voice signals being adapted to match a predefined voice requirement during voice communication with the main terminal, wherein utilizing the predetermined power comprises of transmitting push-to-talk signals of the each handset to the main terminal on activation of a push-to-talk circuit while maintaining the electrical isolation provided by a power conditioning circuit;
receiving the adapted voice signals from the voice cable assembly by the main terminal;

transmitting one or more output voice signals in response to the adapted voice signals to the voice cable assembly by the main terminal for transmission to the one or more handsets of the at least one handset; and adapting the one or more output voice signals transmitted from the main terminal by the voice cable circuit card assembly prior to transmitting the one or more output voice signals to the one or more handsets.

17. The method of claim 16, wherein utilizing the predetermined power by the voice cable circuit card assembly comprises, activating the power conditioning circuit of the voice cable circuit card assembly, generating a first predefined voltage by an isolated direct current voltage converter of the power conditioning circuit based on the predetermined power, and converting the first predefined voltage to a second predefined voltage lower than the first predefined voltage by a shunt regulator of the power conditioning circuit.

18. The method of claim 17, further comprising, providing the second predefined voltage to the push-to-talk circuit of the voice cable circuit card assembly for activation before transmitting the push-to-talk signals.

19. The method of claim 17, further comprising, providing the second predefined voltage to a transmit voice circuit of the voice cable circuit card assembly for activation, and transmitting the adapted voice signals to the main terminal on activation of the transmit voice circuit while maintaining the electrical isolation provided by the power conditioning circuit.

20. The method of claim 16, wherein the one or more output voice signals are adapted by a receive voice circuit of the voice cable circuit card assembly.

* * * * *